United States Patent [19]

Adams et al.

[11] 4,284,855
[45] Aug. 18, 1981

[54] BASE FOR TELEPHONE SET, FOR ALTERNATIVE DESK AND WALL MOUNTING

[75] Inventors: William J. Adams, Franklin; William F. Wernet, Nashville; Steve W. Haskins, Laverne, all of Tenn.

[73] Assignee: Northern Telecom, Inc., Ottawa, Canada

[21] Appl. No.: 68,584

[22] Filed: Aug. 22, 1979

[51] Int. Cl.³ .............................................. H04M 1/02
[52] U.S. Cl. ........................... 179/100 C; 179/100 D; 179/179
[58] Field of Search ............ 179/1 PC, 100 R, 100 D, 179/100 C, 146 R, 147, 178, 179

[56] References Cited

U.S. PATENT DOCUMENTS

| | | | |
|---|---|---|---|
| 3,444,329 | 5/1969 | Krumreich | 179/100 R |
| 3,584,157 | 6/1971 | Prescott | 179/100 D |
| 3,657,487 | 4/1972 | Schwanck et al. | 179/100 R |
| 3,851,119 | 11/1974 | Tucker | 179/146 R |
| 3,898,394 | 8/1975 | Ward et al. | 179/146 R |
| 4,163,874 | 8/1979 | Lenaerts et al. | 179/100 R |

FOREIGN PATENT DOCUMENTS

| | | | |
|---|---|---|---|
| 2438026 | 2/1975 | Fed. Rep. of Germany | 179/178 |
| 2536437 | 9/1976 | Fed. Rep. of Germany | 179/178 |
| 220361 | 7/1942 | Switzerland | 179/100 D |

OTHER PUBLICATIONS

W. Ruffer & W. Wernet; "Hands-free calling gives Residential, GTE Automatic Electric Journal: Mar. 1977;

Primary Examiner—Bernard Konick
Assistant Examiner—Randall P. Myers
Attorney, Agent, or Firm—Schwartz, Jeffery, Schwaab, Mack, Blumenthal & Koch

[57] ABSTRACT

An adaptable telephone baseplate can be used for either wall mounting or desk or table top mounting. The baseplate has an enclosed recess at an intermediate position and a modular jack position at what would be the top edge when wall mounted. A slot connects the jack position and enclosed recess. When wall mounted a short cord can be inserted in the slot with a plug at one end being inserted in the jack at the jack position and a plug at the other end being in the recess for insertion into a wall jack. When desk mounted a normal line cord enters through a groove into the jack position for insertion of a plug into a jack. Alternatively a line cord can enter through the groove, extend along the slot and then pass up through the slot for hard wiring of the conductors to a circuit board. Snap-in mountings are provided for the jack, a circuit board, ringer and possibly other items. For some telephones a battery housing can be provided while in others the battery housing can be omitted, by the alternative use of two inserts in the mold for the baseplate.

9 Claims, 7 Drawing Figures

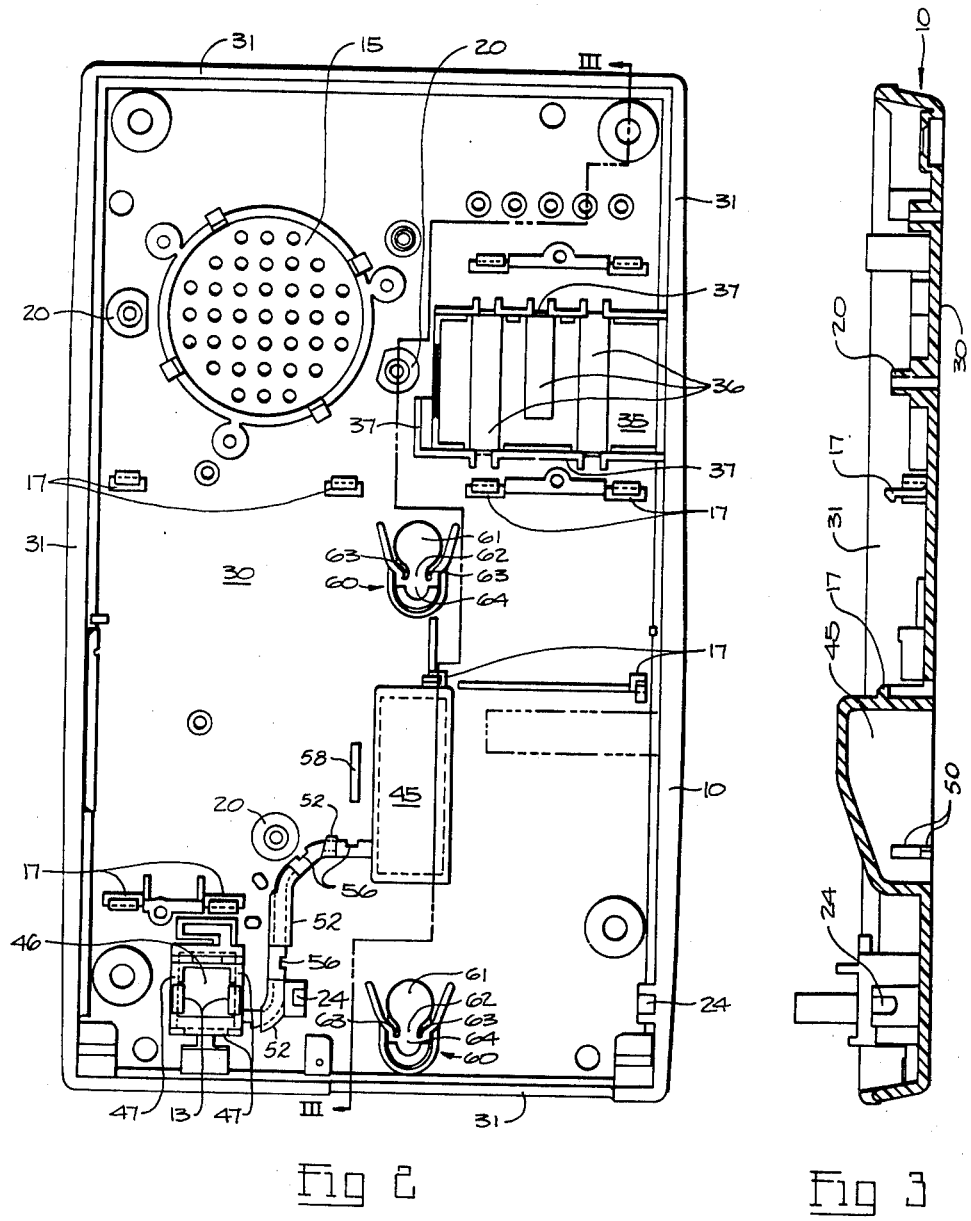

BASE FOR TELEPHONE SET, FOR ALTERNATIVE DESK AND WALL MOUNTING

BACKGROUND OF THE INVENTION

This invention relates to an adaptable telephone base plate for alternative wall or desk top mounting, and is particularly concerned with provision for use of a normal line cord for desk-top mounting and an adaptor line cord for wall mounting, with modular plug and jack installations.

It is becoming more and more general to have modular plug and jack telephone installations with the line cord being inserted at one end, into a jack on the wall, or outlet on the floor in business premises, the other end of the line cord being inserted into a jack in the telephone set base assembly. For wall mounting it can be arranged that the telephone be directly connected to a jack on the wall. However, two forms of base plate are usually provided. With the present invention one form of baseplate permits a normal desk-top mounting with a normal line cord plugging into a jack in the baseplate; wall mounting using a line cord which has a plug at one end to insert into an outlet jack and with the telephone set end of the cord wired directly to terminals in the base assembly-referred to as semi-molular; and wall mounting with a wall jack and a short cord extending in the base from a plug in the wall jack to another plug which inserts into the jack in the baseplate which is common also to the desk-top mounting line cord.

A further feature of the present invention is the provision of a particular form of keyhole mounting apertures for wall mounting. The apertures are provided with cantilevered resilient members which have a snap-action over studs attached to a wall plate.

In modification of the baseplate, provision can be made for the housing of a battery for battery powered operation of certain items which may be provided in some telephone sets. A same basic die can be used with two alternative inserts to provide for alternative forms, with and without battery housing. Other features remain the same.

SUMMARY OF THE INVENTION

Thus, in accordance with one feature of the invention a baseplate includes a recess for housing a plug for insertion into a wall mount jack, a slot and recess formation extending from the recess to a further jack in the baseplate, whereby a short cord can extend along the slot and recess formation from the wall jack to the baseplate jack, the slot and recess formation also enabling a desk-top line cord to extend along the baseplate to terminals in the baseplate, and also the further jack, in the baseplate accepting a line cord plug.

In accordance with another feature of the invention, the baseplate is provided with wall mounting apertures in the form of keyhole slots, the slots each having a waisted portion formed by resilient cantilever members, giving a snap-action over studs attached to a wall mount plate.

BRIEF DESCRIPTION OF THE DRAWINGS

The invention will be readily understood by the following description of certain embodiments, by way of example in conjunction with the accompanying drawings, in which:

FIG. 2 is a top plan view of the baseplate of FIG. 1;

FIG. 3 is a cross-section on the line III—III of FIG. 2;

FIG. 7 illustrates a typical short cord for use in wall mounting.

DETAILED DESCRIPTION OF THE PREFERRED EMBODIMENTS

Figure 1:
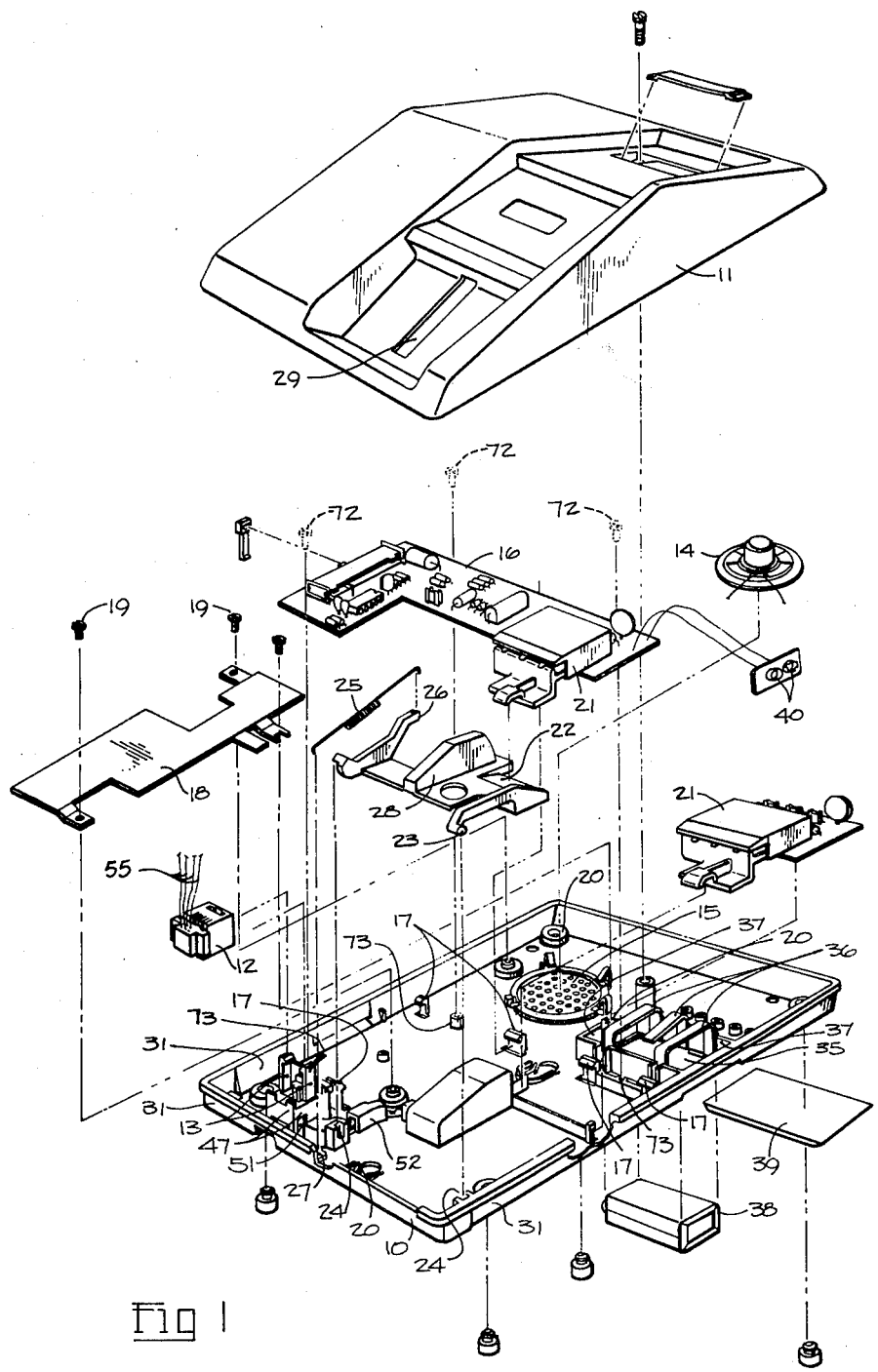
FIG. 1 is an exploded view of a telephone set, showing the baseplate and associated items for assembly thereto.

As illustrated in FIG. 1, a telephone set base comprises a baseplate 10, and a cover or top housing 11, the baseplate and cover forming an enclosure within which are mounted the various telephone items. For example a line cord jack 12 snaps into mounting position 13, at the top end in the wall mounting position, a ringer 14 clips into position at position 15, a circuit board 16 snaps in position and held by resilient snap members 17, a metal weight member 18 is mounted by screws 19 to bosses 20. The hook switch 21 (illustrated twice in FIG. 1) is mounted on the circuit board 20 and the hook switch actuator 22 is mounted on the base plate by projections 23 which fit in vertical grooves 24. A tension spring 25 extends between the end of an arm 26 on the actuator 22 and an anchorage 27 on the baseplate. A vertical rib 28 extends through a slot 29 in the cover 11 for actuation by a handset being replaced on the base. The various mounting positions and related items are also seen in FIG. 2. The baseplate has a base member 30 and a peripherally extending rim 31.

Figure 4:
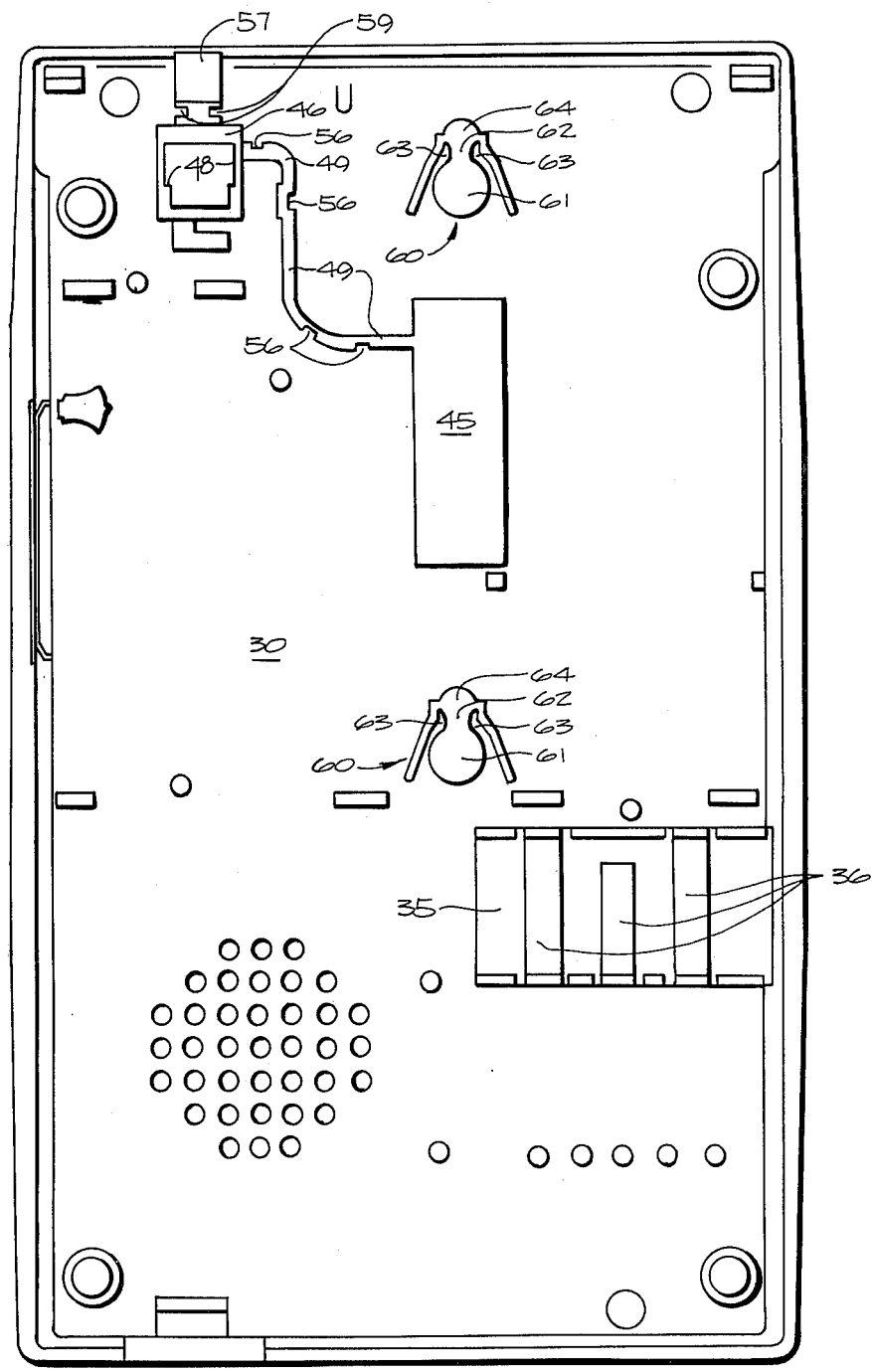
FIG. 4 is a bottom plan view of the baseplate of FIG. 1.

In the example illustrated in FIG. 1, a battery housing is provided. An aperture 35 is formed in the base member, seen also FIGS. 2 and 4 and a plurality of sides 36, with walls 37, form an enclosure for the battery 38. A cover 39 slides in to retain the battery in position. Terminals 40 clip on to the terminals of the battery.

Extending in from the bottom surface of the base member is an enclosed recess 45, seen in cross-section in FIG. 3. An aperture 46 is formed in the base member beneath the position 13 at which is mounted the line cord jack, the aperture being defined by walls 47 extending up from the bottom surface to form a further recess. At the upper end of the recess is a profiled aperture 48 into which fits a modular plug. Connecting the two recesses in a sinuous slot 49. The slot ends at an opening 50 in the side of recess 45, (FIG. 3) and at an opening 51 in one of the walls 47 for the further recess, the slot extending through the base member 30.

Molded on to the top surface of the base member are a number of bridging members 52 which straddle the slot 49. These serve to maintain a cord in position. The slot 49 and members 52 can be used in different ways. In one example, when the telephone set is to be wall mounted, a short cord can be positioned in the slot with one plug in the recess 45, for insertion into the wall jack and another plug inserted through the apertures 48 and 46 to insert into jack 12. Conductors 55 extend from the jack 12 to the circuit board 16. The short cord is inserted from the bottom surface of the base member, being pushed into the slot. Localized restrictions 56 spaced along the slot 49 retain the cord in the slot.

For desk mounting the telephone set, in one form, a line cord having a modular plug at the telephone set end can be used. The plug is inserted in through apertures 46 and 48, and the line cord is positioned in a groove 57 extending in the bottom surface of the base member from the aperture 46 to the periphery of the baseplate. In an alternative form, a line cord not having a modular plug at the telephone set end, but individual conductors is connected by inserting the end position of the cord into the slot 49 and then feeding the end up through the base member and along the side of the recess 45, between the side of the recess and a small rib 58. The individual conductors are then connected to the circuit board. Small protrusions 59 act to retain the cord in the groove 57.

Figure 5:
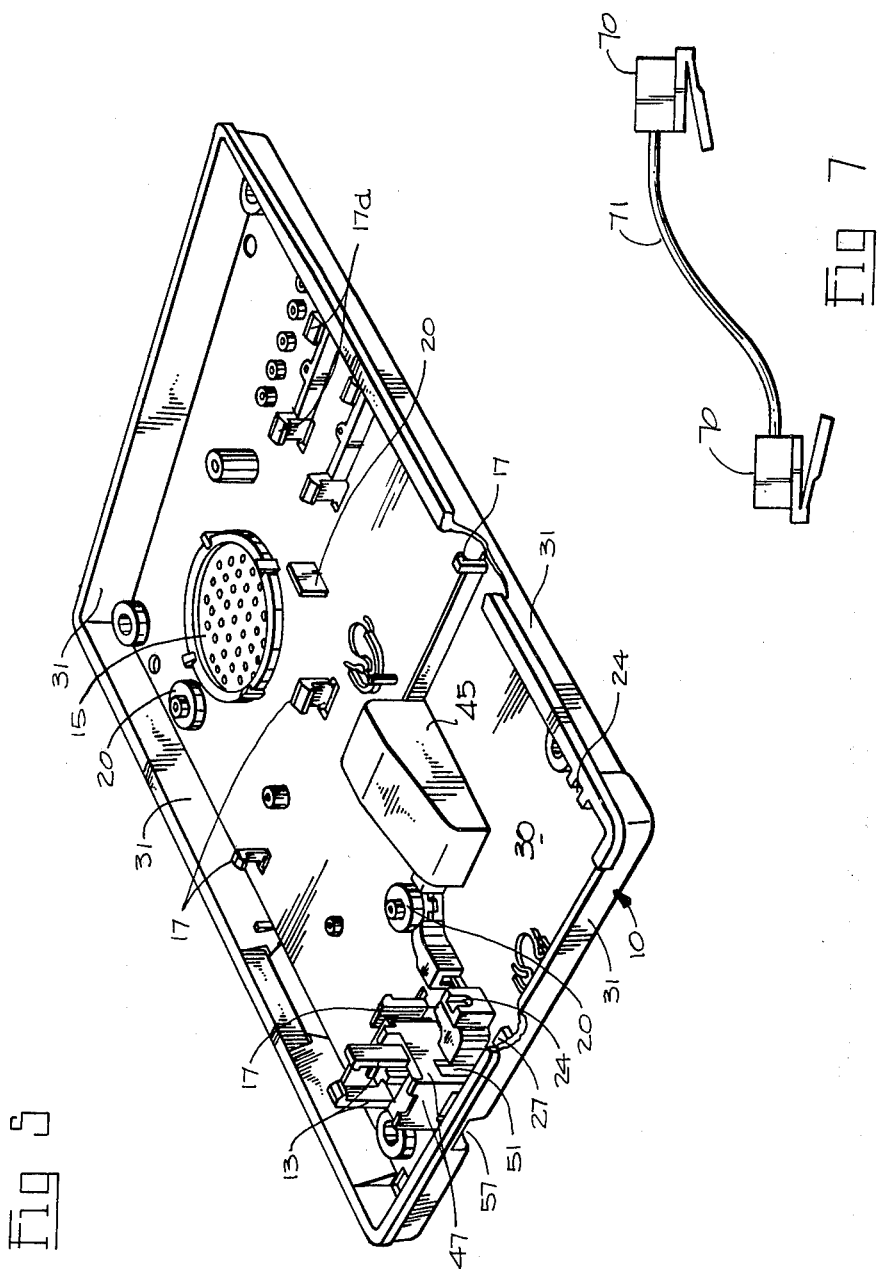
FIG. 5 is a perspective view of an alternative form of baseplate.
Figure 6:
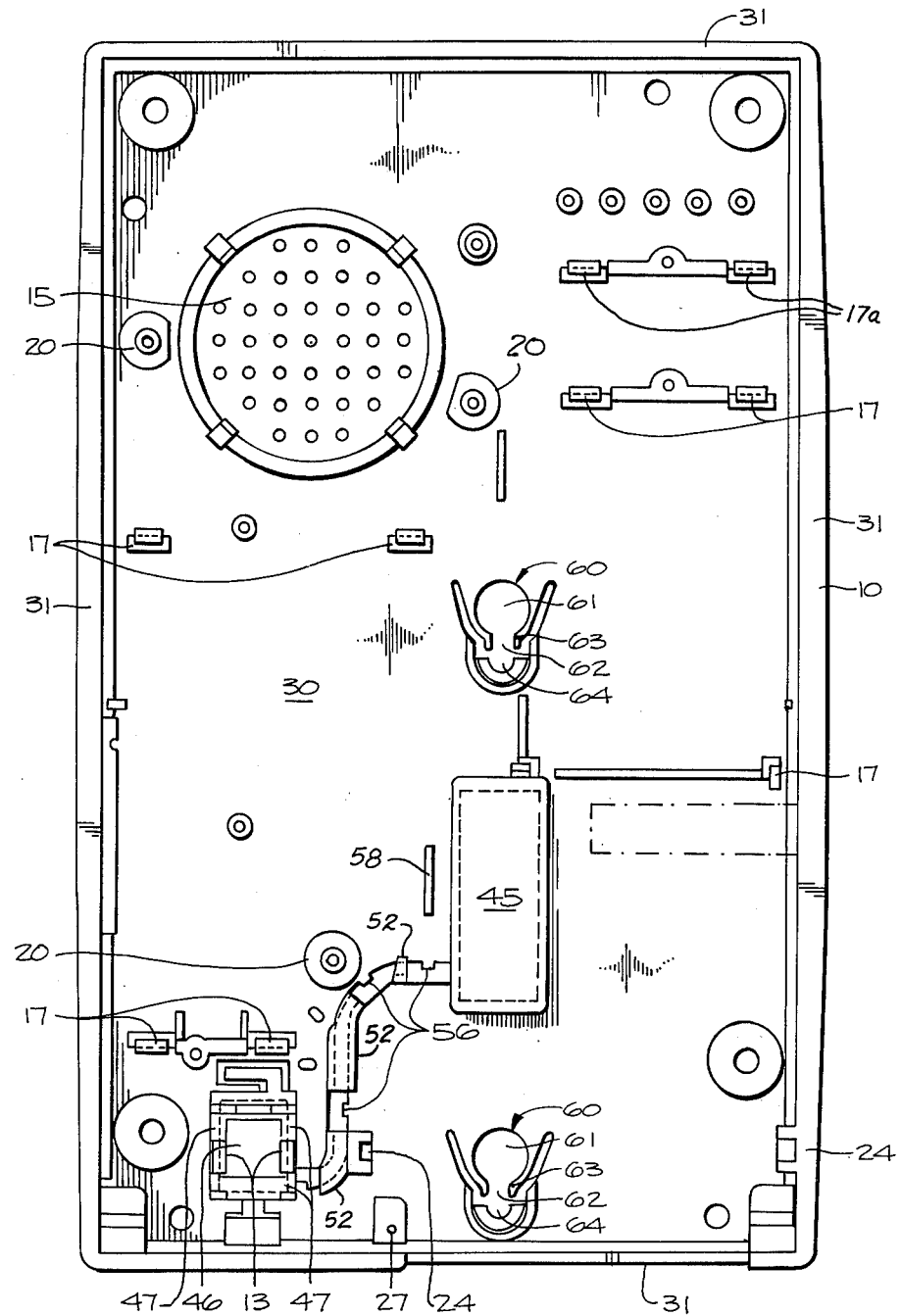
FIG. 6 is a top plan view of the baseplate of FIG. 5.

FIGS. 5 and 6 illustrate an alternative form of baseplate for when a battery is not required. The difference is that the aperture 35, ribs 36 and walls 37 provided in the baseplate of FIGS. 1 to 4 are omitted. This is readily obtained by providing two alternative inserts for the mould, one insert producing the apereture 35, ribs 36 and walls 37 while the other insert omits these details. An alternative form of circuit board 16 is used and two of the snap members 17 are repositioned, as indicated at 17a in FIGS. 5 and 6. The same reference numerals are used in FIGS. 5 and 6 as in FIGS. 1 to 4, for the same items.

Also shown in the drawings is a new and improved wall mounting arrangement. As particularly illustrated in FIGS. 2 and 4 and also in FIG. 6, mounting apertures 60 of "keyhole" form, having a main circular portion 61 and a waisted slot portion 62. The waisted slot portion is formed by two resilient members 63. The members form part of the circumference of the circular aperture portion 61, being arcuate for the first portions, and the ends of the members being curved outwards to present convex surfaces in opposition. The ends of the members 63 may be free, as shown, or attached to the main base member 30. The portion 61 is at the bottom of the formation when the base is in the wall mounting position. A mounting plate attached to the wall has two studs extending therefrom, the studs having a stem and a head, the head of larger diameter than the stem. The head can pass through the portion 61 but is larger than the rest of the formation. The stem is a snap fit through the waisted portion 62, passing through by deflection of the cantilever members 63. Once through the waisted portion the stem is urged to the upper end of the formation being resiliently held in a semicircular portion 64 by the ends of the members 63. The telephone set can be removed from the wall by pushing upwards, when the stems of the studs deflect the members 63 outwards until the heads of the studs are in the portions 61. More than two "keyhole" apertures can be provided for accompanying different stud spacings.

FIG. 7 illustrates a typical short cord for insertion in the slot 49. The modular plugs 70 at each end of the cord 71 are conventional in form.

While the term desk-top mounting has been used, this is intended to include any form of mounting on a horizontal or substantially horizontal surface, for example a table, shelf or similar.

To provide what can be termed a "back-up" or "rework" facility, screws 72 can be inserted in bosses 73, the screw heads overlapping an edge of the circuit board, in the event that any of the tabs 17 break off. If one or more tabs break off, one or more screws are inserted to hold down the circuit board.

What is claimed is:

1. An adaptable telephone baseplate for alternative wall and desk top mounting, comprising:
    a base member and a peripherally extending rim on the base member extending upwardly from a top surface on the base member;
    an enclosed recess extending from a bottom surface of the base member up through the base member and upwardly of said top surface, for positioning of a modular wall mounting plug therein, said recess being defined by a first aperture in said base member, upwardly extending side walls around the periphery of said first aperture and a top wall extending between said side walls at a position above said base member, said top and side walls enclosing said recess from the remainder of the top surface of said base member;
    modular jack mounting means at a top end of the base member, said modular jack mounting means being aligned with a second aperture through the base member for insertion of a modular line cord plug through said second aperture and into a jack mounted at said mounting means;
    a slot in said base member extending from said enclosed recess to said second aperture, for insertion of a short cord between said modular wall mounting plug and a further modular plug adapted for insertion into said jack for wall mounting of the baseplate; and
    at least two mounting apertures in said base member, each said mounting aperture of keyhole formation and comprising a circular aperture portion and a waisted slot portion, the slot portion narrower than the diameter of the circular aperture portion and positioned above the circular aperture portion when the baseplate is in a wall mounting position, said waisted slot portion defined by two spaced resilient members for producing a snap fit on a mounting stud attached to a wall.

2. A baseplate as claimed in claim 1, including bridging members extending over said slot on said top surface of said base member.

3. A baseplate as claimed in claim 1, including a ringer mounting position on said base member, and resilient snap members extending up from the top surface at said ringer mounting position for retaining a ringer in position.

4. A baseplate as claimed in claim 1, including a plurality of resilient snap members extending upwards from said top surface of the base member, said snap members positioned to retain a circuit board in position on said base member.

5. A baseplate as claimed in claim 1, said resilient members each comprising a first arcuate portion defining part of the circumference of the circular aperture portion and an end portion curved round and outwards whereby the two spaced resilient members present convex surfaces in opposition.

6. A baseplate as claimed in claim 5, each mounting aperture including a semicircular portion on the opposite side of said waisted slot portion to said circular aperture portion.

7. A baseplate as claimed in claim 1, said slot being of sinuous form.

8. A baseplate as claimed in claim 1, said modular jack means offset to one side of said base member at said top end, said enclosed recess positioned downwardly from said top edge towards the centre of the base member, said slot of sinuous form ending at one end at an opening in a side wall of the enclosed recess and ending at the other end at an opening in a side wall forming part of said modular jack mounting means.

9. A baseplate as claimed in claim 1, including a further aperture through said base member, walls extending around said aperture on the top surface of said base member to define a battery receiving housing, a plurality of ribs extending across said housing from top edges of said walls, and a cover slidingly received in said aperture to close said aperture and retain a battery in said housing.

* * * * *